United States Patent [19]

Salvagnini

[11] Patent Number: 4,553,672
[45] Date of Patent: Nov. 19, 1985

[54] SELECTION SYSTEM FOR FLAT ARTICLES, PARTICULARLY METAL SHEETS OF DIFFERENT SIZES COMING FROM A SHEARING MACHINE

[75] Inventor: Guido Salvagnini, Sarego, Italy

[73] Assignee: Salvagnini Transferica S.p.A., Sarego, Italy

[21] Appl. No.: 611,154

[22] Filed: May 17, 1984

[30] Foreign Application Priority Data

May 20, 1983 [IT] Italy .............................. 21197 A/83

[51] Int. Cl.⁴ .......................... B07C 5/04; B07C 9/00; B65G 37/00
[52] U.S. Cl. .................................... 209/615; 198/372; 209/698; 271/184; 271/225; 271/245; 271/297; 271/305; 414/51; 414/90
[58] Field of Search .............. 209/615, 606, 627, 698, 209/656, 657; 271/184, 225, 245, 297, 302, 305; 198/361, 367, 369, 372; 414/51, 53, 86, 90, 107

[56] References Cited

U.S. PATENT DOCUMENTS

| 3,411,639 | 11/1968 | Dryon | 414/90 |
| 3,596,575 | 3/1971 | Brockmuller | 414/90 |
| 4,016,072 | 4/1977 | Cavenar | 209/698 |
| 4,051,957 | 10/1977 | Parups | 271/184 |
| 4,082,174 | 4/1978 | Stobb | 198/372 |
| 4,093,083 | 6/1978 | Klaus | 414/107 |

FOREIGN PATENT DOCUMENTS

| 2492787 | 4/1982 | France | 209/606 |
| 146025 | 7/1962 | U.S.S.R. | 271/184 |

Primary Examiner—Robert B. Reeves
Assistant Examiner—Donald T. Hajec
Attorney, Agent, or Firm—Cushman, Darby & Cushman

[57] ABSTRACT

Selectors which can be worked alternately are placed along the advancement path of articles having different sizes. Each selector is constituted by a rake structure with L-shaped prongs which can be moved from an upper rest position, where the prongs do not interfere with the advancement of the articles along said path, to a lower pick up position where the prongs stop the advancement of the articles and then again to an upper discharge position, where the prongs, after having lifted the engaged articles, allow their conveyance towards collection places, such as piling hoppers.

7 Claims, 9 Drawing Figures

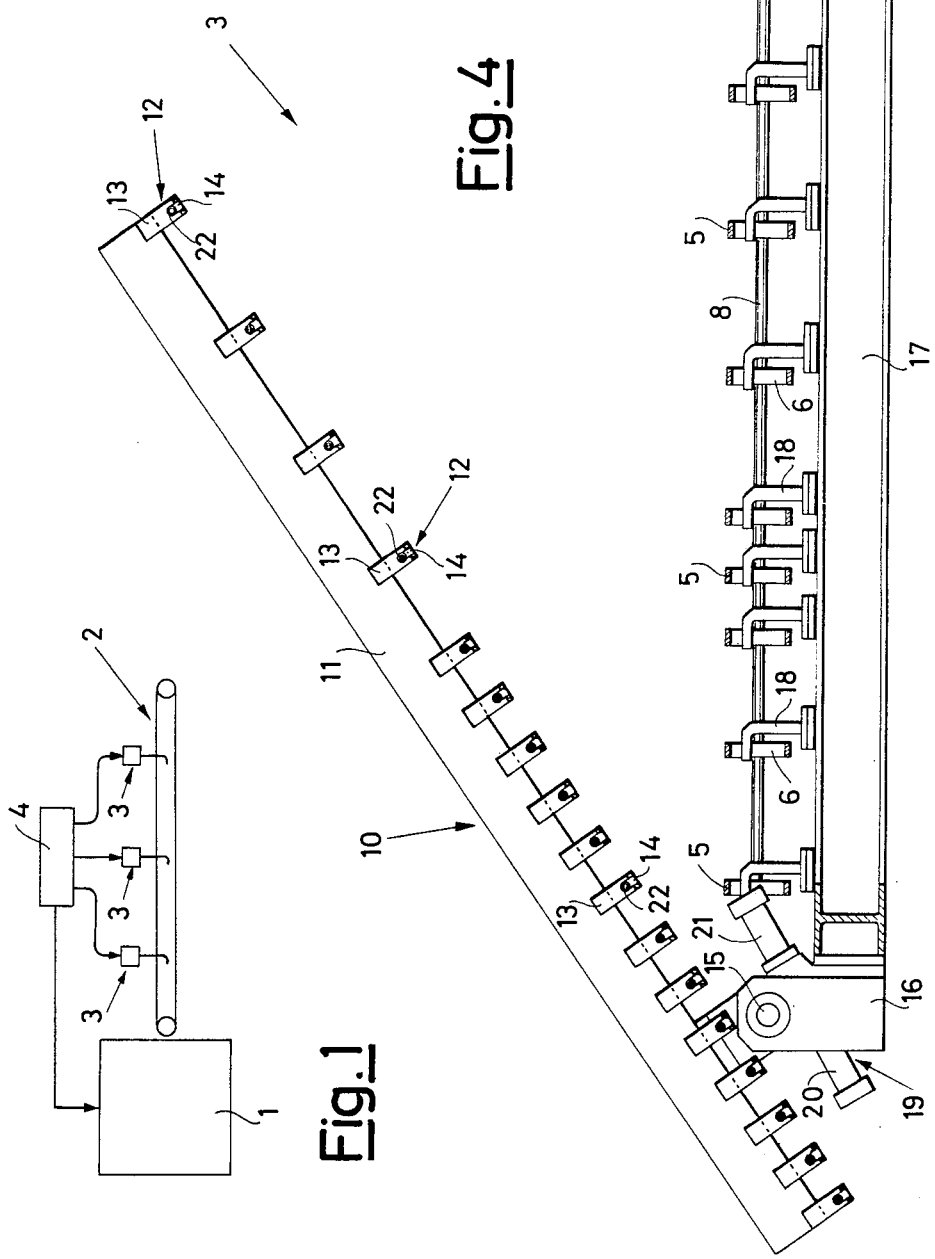

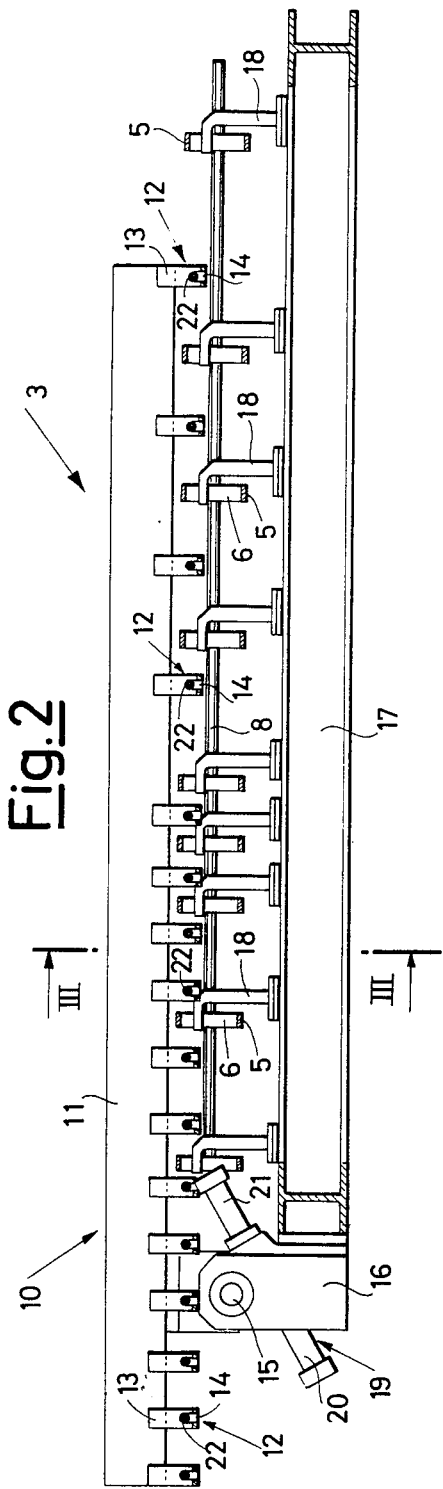
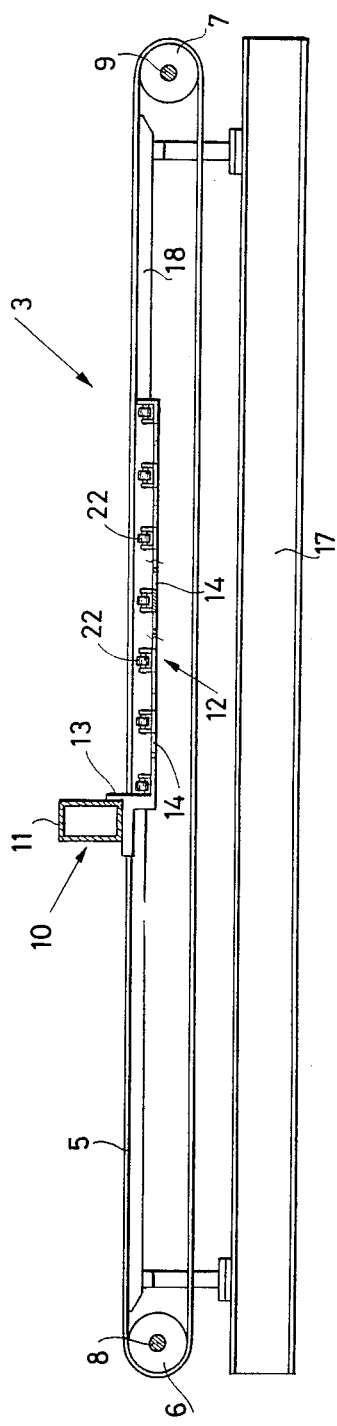

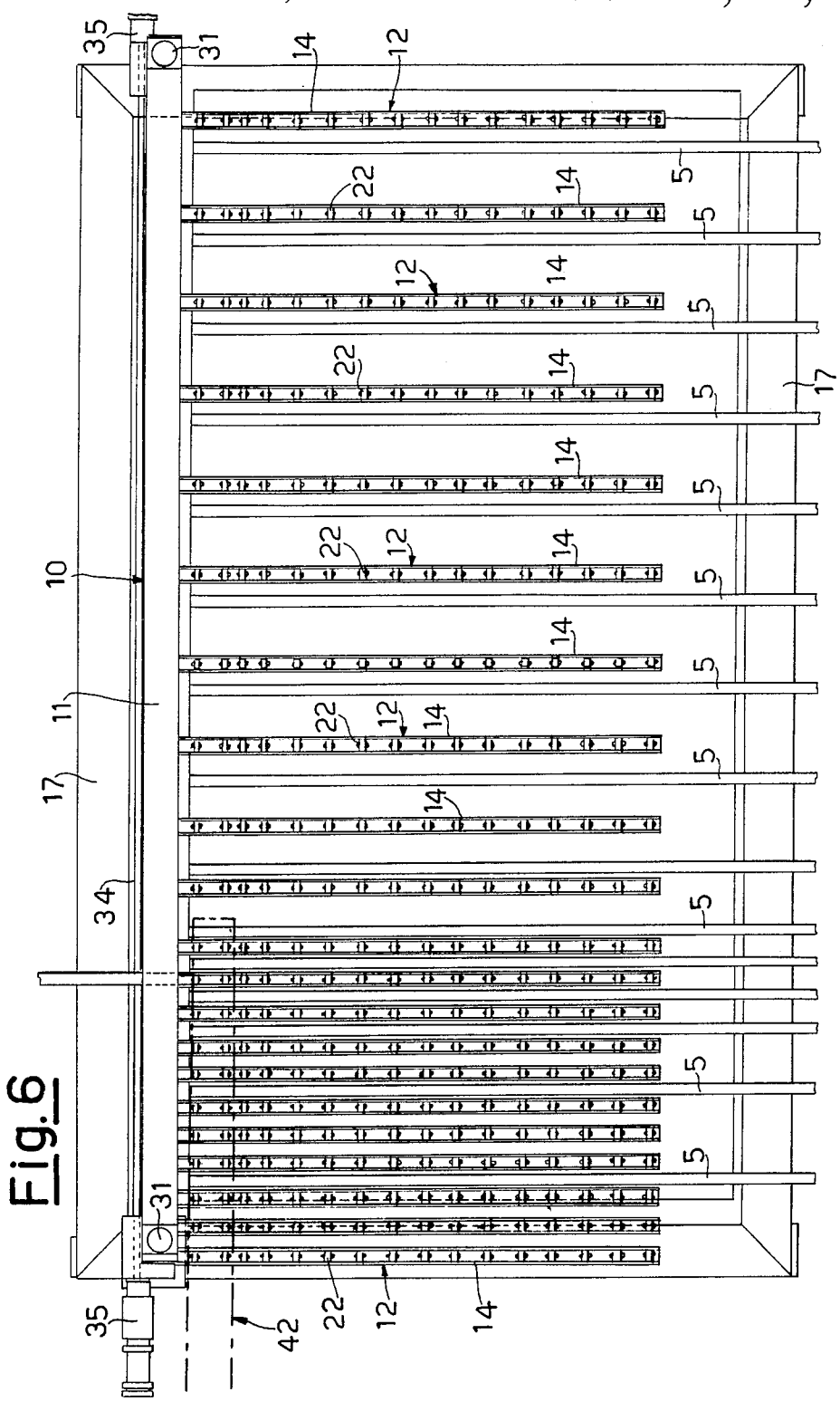

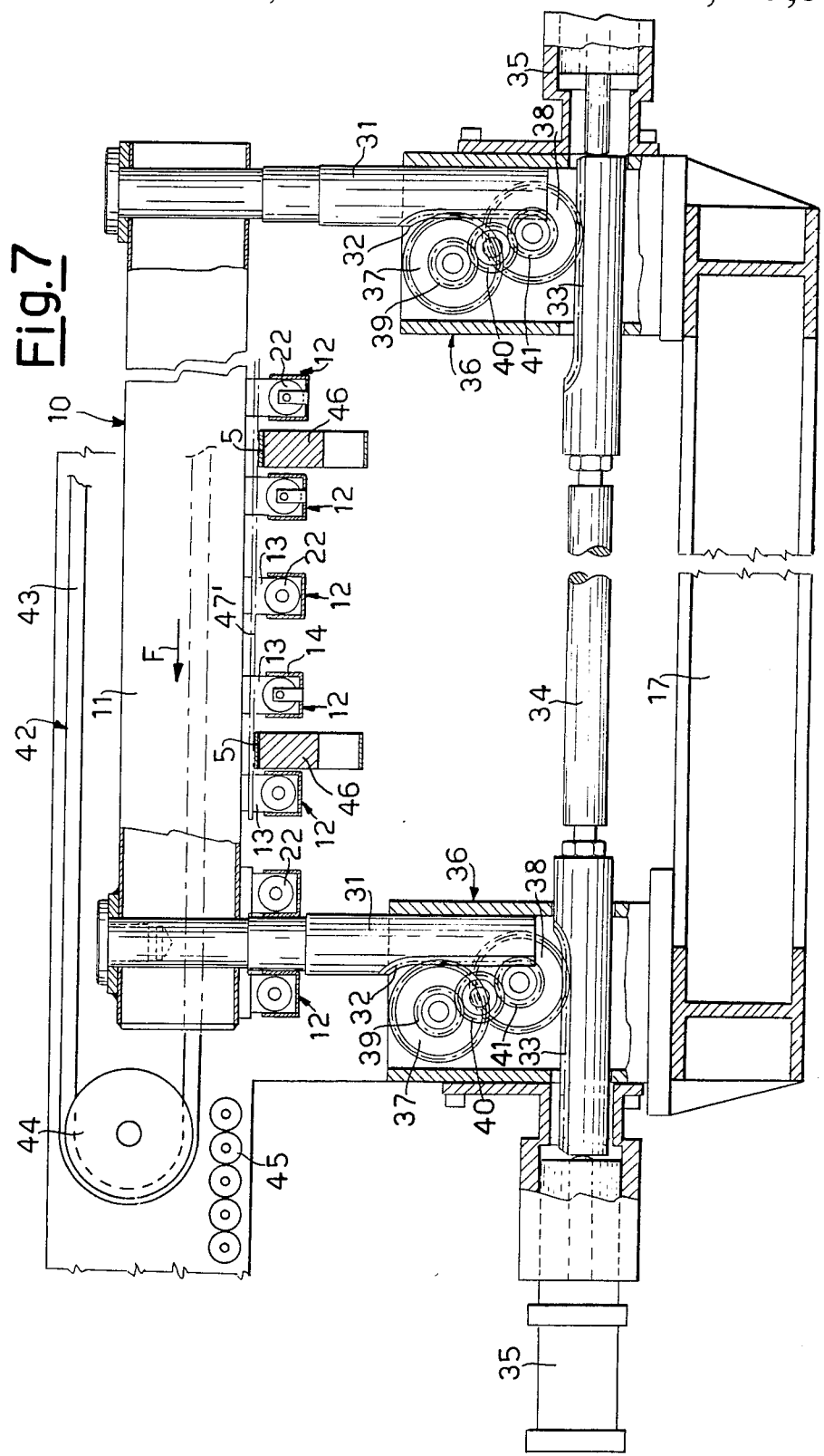

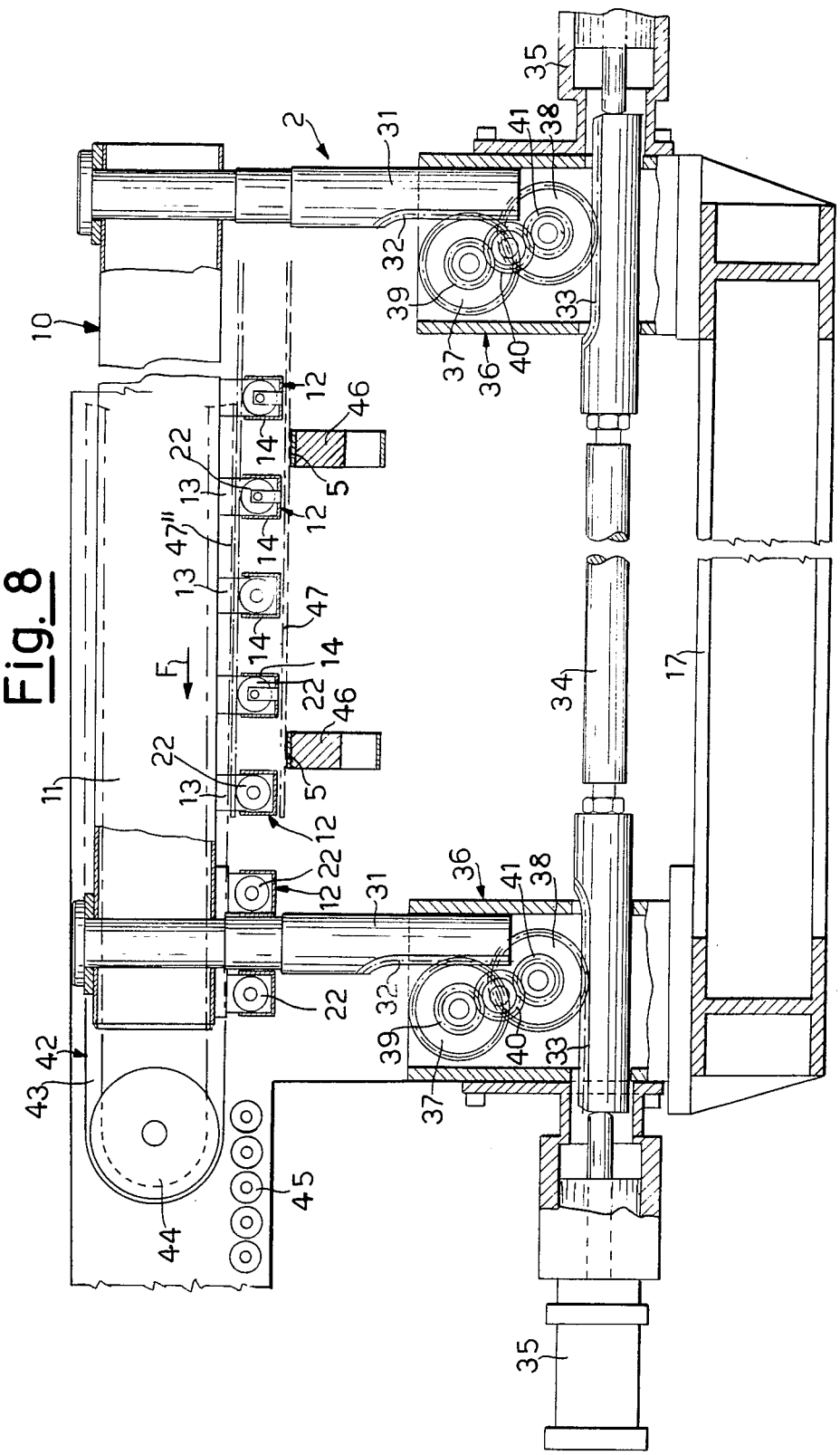

SELECTION SYSTEM FOR FLAT ARTICLES, PARTICULARLY METAL SHEETS OF DIFFERENT SIZES COMING FROM A SHEARING MACHINE

This invention relates to a selection system for flat articles, particularly for metal sheets of different sizes coming from a shearing machine.

There are known shearing machines which cut a metal sheet in sheets having the same size and others which, in order to reduce the swarf, cut in sheets of very different sizes.

In the first case the piling of the cut sheets is made in a very simple way by causing each sheet to fall and then to slide on an inclined plane downstream the shearing machine to a kind of hopper, which directs it towards the top of a pile. From time to time the hopper is adapted to the size of the pile which one intends to form and for a certain period one can cut only sheets of that size.

On the contrary, in the second case, the problem becomes complicate and difficult to solve.

An object of the present invention is to solve the problem of the piling of metal sheets of different size coming from a shearing machine or, more in general, of any other kind of flat articles.

According to this invention this object is attained by employing a selection system, comprising a plurality of selectors which are placed along an advancement path of the articles and can be worked alternately to deviate selected articles from said path to respective collection places, characterized in that each of said selectors is constituted by a rake structure with L-shaped prongs, which is arranged transversally with respect to the advancement path of the articles and can be moved from an upper rest position, where said prongs do not interfere with the advancement of said articles along said path, to a lower pick up position, where said prongs stop the advancement of the articles and then again to an upper discharge position, where said prongs, after having lifted said engaged articles, allow their conveyance towards said collection places.

It is self-evident that a plurality of thus formed selectors allows to select and to convey the different articles towards one or the other of the collection places according to the different size of said articles. All the articles having the same size reach the same collection place, where it can be provided an hopper having a fixed size, which provides their piling, separately from the articles having different sizes.

Alternately it can be also provided the grouping of the articles according to their destination instead of their size.

Two embodiments are shown by way of non-limitative examples in the enclosed drawings, in which:

FIG. 1 shows the general diagram of the selection system according to this invention, when it is used for selecting metal sheets of different sizes coming from a shearing machine;

FIG. 2 shows the construction details of a first example of selector comprised in said system, seen in pick up position, from left with respect to FIG. 1;

FIG. 3 shows a section of said selector along the line III—III of FIG. 2;

FIG. 4 shows said selector according to the same view of FIG. 2, excepting that the rake structure is arranged in discharge position, coinciding with the rest-one;

FIG. 6 shows the selector of FIG. 5 in top plan view;

FIG. 7 shows enlarged details of the selector of FIGS. 5 and 6, still laterally seen in pick up position as shown in FIG. 5 but with sectioned parts;

FIG. 8 is a view similar to that of FIG. 7 but with the selector in discharge position;

FIG. 9 shows the selector of FIGS. 5-8 as cross-sectioned from left with respect to FIGS. 5 and 6.

Figure 5:
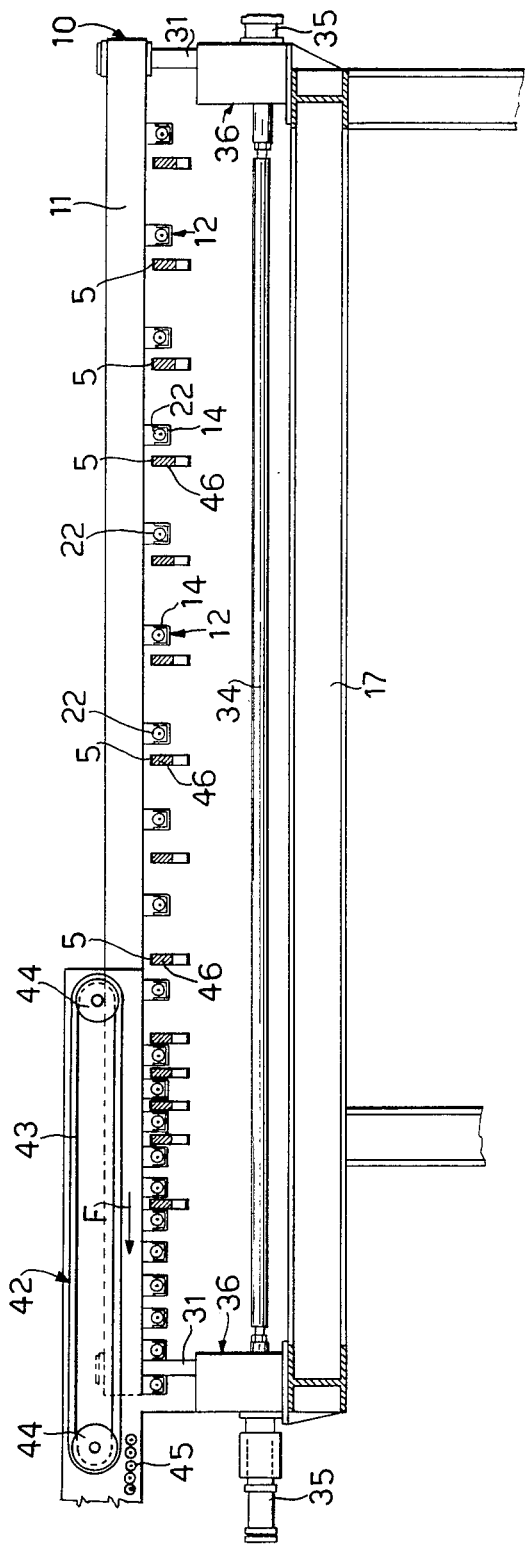
FIG. 5 shows a side view of a second example of selector according to the invention in pick up position as shown in FIG. 2.

FIG. 1 shows the whole shearing machine 1, an output conveyor 2 and a selection system formed by a plurality of selectors 3 arranged along the conveyor 2. Furthermore it is shown a control program unit 4, which causes the correct and correlate working of the shearing machine 1 and of the selection system for the cut sheets of different sizes by the former and their sorting towards different collection and piling places according to their sizes, by the latter.

A first embodiment of said selectors 3 is shown in detail in FIGS. 2, 3 and 4, where it is also shown that the conveyor 2 is constituted by a plurality of adjacent belts 5 stretched between respective pairs of pulleys 6 and 7 connected by respective common shafts 8 and 9, one of which is motorized.

The selector comprises a movable rake structure 10, which is constituted by a beam 11 arranged transversally with respect to the conveyor 2 and by a plurality of projecting prongs 12, each L-shaped, with a first portion 13 which extends perpendicularly from the beam 11 and a second perpendicularly turned portion 14 which is directed towards the inlet of the conveyor 2, i.e. towards the shearing 1; as shown in FIG. 3, said turned portion 14 carries a plurality of small idle wheels 22. The beam 11 is pivoted in 15 on a support 16 fixed in its turn to a supporting frame 17. This latter supports also a plurality of supporting structures 18 for each conveyor belt 5.

A working device 19, for example of the kind having two hydraulic opposite cylinder 20 and 21 with connecting rack mashing with a pinion keyed on the rotation pin 15, allows the rotation of the rake structure 10 between the horizontal pick up position of the FIGS. 2 and 3 and the inclined rest position or discharge position of FIG. 4.

In the first position the turned portions 14 of the prongs 12 are inserted between each of the belts 5 of the conveyor 2, slightly under the resting plane defined by them. In this position the perpendicular portions 13 of the prongs prevent the advancement of the metal sheets along the conveyor 2, causing them to stop against the same prongs.

In the second position the prongs 12 are, on the contrary, lifted with respect to the belts 5, so as not to interfere with the advancement of the arriving sheets and to define with their turned portions 14 an inclined sliding plane for the sheets previously stopped and then lifted. In this position the small wheels 22 make easy the sliding of the sheets and their subsequent discharge in a collection place, which is preferably a piling hopper.

It results the following way of working of the selector 3 and, in general, of the selecting system with more selectors placed at the outlet of the shearing machine. Until a selector has its own rake structure 10 arranged in the inclined rest position of FIG. 4, the sheets carried

United States Patent [19]

Wright

[11] Patent Number: 4,553,673

[45] Date of Patent: Nov. 19, 1985

[54] METHOD AND APPARATUS FOR OBTAINING UNDERCUTS OF CONCENTRATES FROM PULP FLOW IN SPIRAL SEPARATORS

[75] Inventor: Douglas C. Wright, Terranora, Australia

[73] Assignee: Mineral Deposits Ltd., Queensland, Australia

[21] Appl. No.: 438,590

[22] Filed: Nov. 2, 1982

[51] Int. Cl.[4] .......................... B03B 11/00; B03B 5/52
[52] U.S. Cl. ................................... 209/697; 209/459; 209/493; 209/494
[58] Field of Search ............... 209/696, 697, 458, 459, 209/493, 494, 495, 506, 211

[56] References Cited

U.S. PATENT DOCUMENTS 2,431,560  11/1947  Humphreys ................... 209/459 X
4,189,378   2/1980  Wright et al. ....................... 209/459

*Primary Examiner*—Robert B. Reeves
*Assistant Examiner*—Edward M. Wacyra
*Attorney, Agent, or Firm*—Stevens, Davis, Miller & Mosher

[57] ABSTRACT

This invention relates to a take-off assembly for mounting in a spiral separator. The take-off assembly includes an adjustment tongue and a mating member containing a transverse aperture for receiving the adjustment tongue. The mounting member has a surface surrounding the adjustment tongue which is substantially flush with the top surface of the adjustment tongue. There is also provided an undercut for obtaining an undercut of concentrates particles from pulp flowing in the spiral separator whereby tailings and/or middlings contained in an upper portion of the pulp above the concentrates particles may flow across the transverse aperture.

There is also provided a spiral separator for gravity separation of minerals containing the take-off assembly and a method of taking undercuts including using the abovementioned take-off assembly in the spiral separator.

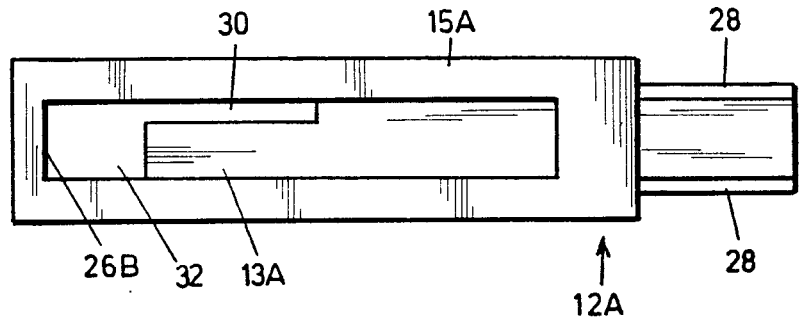

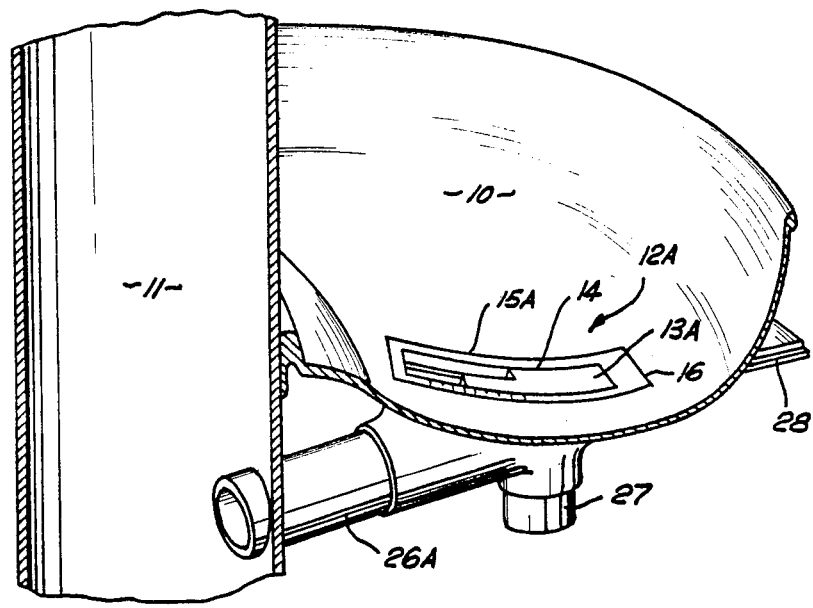

1 Claim, 6 Drawing Figures